United States Patent Office 3,256,243
Patented June 14, 1966

3,256,243
PROCESS FOR PREPARING POLY(HALO-PHENYLENE ETHERS)
Harry S. Blanchard, Schenectady, and Herman L. Finkbeiner, Ballston Lake, N.Y., assignors to General Electric Company, a corporation of New York
No Drawing. Filed Dec. 31, 1962, Ser. No. 248,228
4 Claims. (Cl. 260—47)

This invention relates to a method of producing poly(halophenylene ethers). More specifically, this invention relates to the process of producing poly(halophenylene ethers) from a cupric complex having the formula

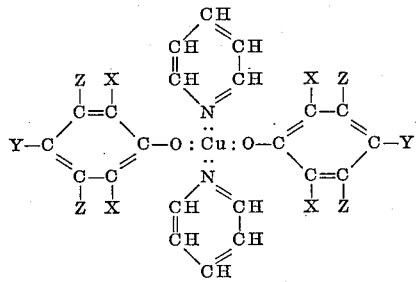

where X is a halogen selected from the group consisting of fluorine and chlorine and, in addition, bromine when Y and each Z are bromine, Y is a halogen selected from the group consisting of chlorine, bromine and iodine, and Z is a monovalent substituent selected from the group consisting of hydrogen, fluorine and chlorine, and, in addition, bromine when Y and each X are bromine.

In a copending application, Serial No. 248,191, Hay, filed concurrently herewith and assigned to the same assignee as the present invention, there is disclosed and claimed a method of oxidatively coupling halophenols to poly(halophenylene ethers) by reacting oxygen with a halophenol using as the oxygen-carrying intermediate, a solution of a basic cupric salt complex of an aromatic, heterocyclic amine. Pyridine is one of the aromatic, heterocyclic amines which may be used.

We have now found that the cupric complex corresponding to the above empirical formula may be thermally decomposed in solution to also produce poly(halophenylene ethers).

The novel complexes are readily prepared by reacting a phenol having the formula

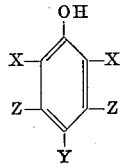

where X is a halogen selected from the group consisting of fluorine and chlorine and, in addition, bromine when Y and each Z are bromine, Y is a halogen selected from the group consisting of chlorine, bromine and iodine, and Z is a monovalent substituent selected from the group consisting of hydrogen, fluorine and chlorine and, in addition, bromine when Y and each X are bromine, in a solution also containing cupric hydroxide and pyridine. Pyridine is apparently unique in forming our novel crystalline complexes. The cupric hydroxide may be added as such, formed in situ from a cupric salt and hydroxide, or by using a cupric salt and the alkali metal salt of the phenol, all of which produce the same novel complex and, therefore, are equivalent. The reaction proceeds readily at room temperature, but may be hastened by heating, providing excess pyridine is used which stabilizes the complex from decomposing to form the poly(halophenylene ethers). The cupric hydroxide does not completely dissolve until the complex with the halophenol and pyridine is formed, thus permitting one to readily determine when the reaction is completed.

The phenols which can be used are represented by the above general formula. Typical examples of such phenols are, by way of example, 2,4,6-trichlorophenol,
2,3,4,6-tetrachlorophenol,
Pentachlorophenol,
Pentabromophenol,
2,6-dichloro-4-bromophenol,
2,6-dichloro-4-iodophenol,
2,6-difluoro-4-chlorophenol,
2,6-difluoro-4-bromophenol,
2,6-difluoro-4-iodophenol,
2,3,5,6-tetrafluoro-4-chlorophenol,
2,6-difluoro-3,5-dichloro-4-bromophenol,
2-chloro-3-bromo-6-fluorophenol, etc.

By use of the lower aliphatic alcohols such as methanol and ethanol, the copper complex of the phenol and pyridine precipitates readily from the solution so that it can readily be removed by filtration. If a solvent is used for the process in which the complex is soluble, for example, benzene, toluene, etc., methanol can be added to precipitate the complex, or the solution can be evaporated under vacuum at room temperature to evaporate the solvent and deposit the complex as the residue. These complexes may be purified by recrystallizing one or more times and are obtained as glistening brown crystals. These cupric complexes and their method of preparation are disclosed and claimed in our copending application Serial No. 510,415, filed September 2, 1965, as a division of this application.

When these complexes are dissolved in a solvent having a boiling point of at least 80° C. and heated to a temperature of at least 80° C. up to the reflux temperature of the solution, these complexes thermally decompose to produce a poly(halophenylene ether) and a complex of pyridine and a cupric salt containing the halogen removed from the phenol.

In the thermal decomposition of cupric complexes, the reaction involves the ortho or para position, with the exact position being dependent upon the ease with which the halogen occupying either of these two positions is removed in relation to the halogen in the other position. For example, in the case of the cupric pyridine complex of 2,4,6-trichlorophenol, chlorine is removed in the thermal decomposition reaction, in some cases in the para position and in some cases in the ortho position, with the chlorine in the para position being preferentially removed. When the halogen in the para position has a higher atomic number than the halogen in either of the ortho positions, e.g., iodine or bromine in the para position and fluorine or chlorine in the two ortho positions, then the reaction proceeds preponderantly by removal of the halogen in the para position. The coupling reaction, therefore, involves the halogen in either the ortho or para position and the hydrogen of the phenolic hydroxyl group to form the poly(halophenylene ethers).

The poly(halophenylene ethers) produced when the halogen is eliminated from the para position will have repeating units that correspond to the structural formula

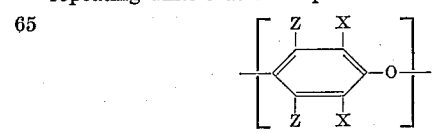

where X and Z are as previously defined for the starting phenol, and the oxygen atom of one unit is connected to the benzene nucleus of the adjoining unit. If a halogen atom is eliminated from one of the ortho positions, the repeating unit will correspond to the structural formula

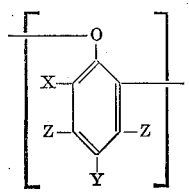

where X, Y and Z are as previously defined for the starting phenol, and again the oxygen atom of one unit is connected to the benzene nucleus of the adjoining unit. However, since the halogens as defined for Y are always equal to or greater in atomic number over the halogens defined for X, the reaction will never go exclusively through the ortho position under these conditions, so that even when the halogens represented by X and Y are the same, the polymer molecule will have some of the phenol units joined through the ortho position and some phenol units joined through the para position, the exact proportion being determined by the reactivity of the halogen in these two positions. This is desirable since the polymers formed exclusively through coupling in the ortho position are very low molecular weight oils. As pointed out previously, when the halogen is the same in both the para and ortho position, the para position is generally the more reactive and is predominantly the reactive position when Y is a halogen of higher atomic number. Such a mixed polyphenylene ether would be represented by a mixture of the above two units. It is understood that these repeating units form a long chain to provide a final molecular structure representing many repeating units.

The thermal decomposition of our copper complexes is capable of producing poly(halophenylene ethers) having molecular weights in the range of 7,500 to 12,000 and higher. Poly(halophenylene ethers) have previously been made, for example, by Hunter et al., J. Am. Chem. Soc., 38, 1761 (1916), by preparation of silver salts of the halophenols which are then thermally decomposed in solution to precipitate silver halide, leaving the polymer in solution. The use of silver makes this an extremely expensive method of preparation.

In forming our novel crystalline cupric complexes, the reaction involves 2 moles of phenol, 2 moles of pyridine and 1 mole of cupric hydroxide. It is therefore possible to form a crystalline complex which has two different phenol molecules on the same copper atom, which can then be thermally decomposed to give a copolymer. Likewise, more than one cupric complex involving two or more phenols may likewise be decomposed in the same solution to give mixed polymers and copolymers. Furthermore, if the poly(halophenylene ethers) are the desired product, it is possible to use a solvent in which the complex is soluble, to form the complex and then thermally decompose this solution without actually isolating the intermediate complex.

In order that those skilled in the art may better understand our invention, the following examples are given which are illustrative of the practice of our invention, and are not intended for purposes of limitation. In the examples, all parts are by weight, unless otherwise stated.

*Example 1*

This example illustrates two methods for the formation of the cupric complex by starting with either cupric hydroxide or with a cupric salt.

*Method A.*—One mole of cupric hydroxide, 2 moles of the halophenol and 200 ml. of pyridine are added to 4 liters of methanol. The heterogeneous mixture is stirred magnetically for 4 hours, during which time the color changes from blue to brown. At the end of the 4 hours, the solids are removed by filtration and recrystallized by dissolving in hot benzene containing pyridine. After filtering the hot solution to remove any undissolved material, this solution is diluted with methanol and cooled whereupon the copper complex crystallizes as glistening brown crystals.

*Method B.*—One mole of cupric chloride, 2 moles of the halophenol and 2 moles of a base, for example, sodium methylate, or potassium hydroxide, are dissolved in 4 liters of methanol. The product is reacted at room temperature for 2 hours and the resulting solid complex removed by filtration and purified as in Method A.

*Example 2*

A general method of thermally decomposing the copper complexes is to dissolve the complex in a solvent having a boiling point of at least 80° C. and heating the solution usually at reflux. The copper pyridine halide complex is removed by filtration and the polymer precipitated from the solution with methanol.

*Example 3*

Utilizing both Methods A and B of Example 1, 2,4,6-trichlorophenol produces a deep brown crystalline compound having 10.8% copper, 43.3% carbon, 2.35% hydrogen, 34.9% chlorine, and a molecular weight of 640, which agrees very well with the theoretical of 10.3% copper, 43% carbon, 2.28% hydrogen, 34.7% chlorine and a molecular weight of 614.5.

This complex has the formula

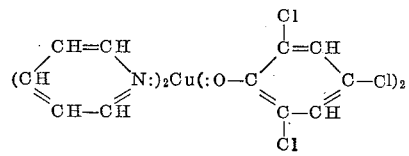

*Example 4*

Repeating Example 3 but using 2,6-dichloro-4-bromophenol, produces a brown precipitate of the copper complex containing chlorine and bromine and having the formula

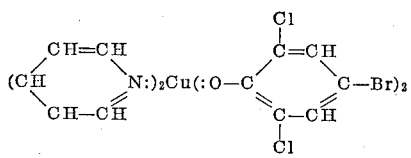

*Example 5*

Repeating Example 3 but using pentachlorophenol in place of the 2,4,6-trichlorophenol, likewise gives a green precipitate having 8.3% copper, against the theoretical of 8.4%, and having the formula

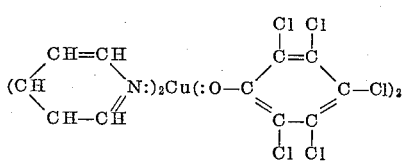

*Example 6*

Repeating Example 3 but using pentabromophenol in place of the 2,4,6-trichlorophenol again produces a brown precipitate of the copper complex having the general formula

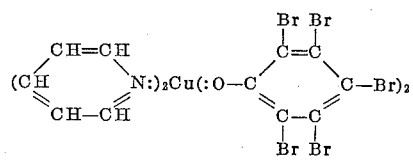

Example 7

The copper complexes formed in the above examples, except those prepared from the pentahalophenols are readily thermally decomposed at temperatures as low as 80° C. by heating them in a solution of a solvent having a boiling point of at least 80° C. Evidently, the copper complexes from the pentahalophenols are more thermally stable since they do not decompose until heated to temperatures of 175° to 200° C., in an appropriate solvent, for example, diphenylether. The polymers are obtained as described in Example 2 and vary in color from very light tan to pure white. Those polymers prepared by heating for a short period of time have molecular weights ranging in the range from 7,500 to 12,000, while those obtained by heating for longer periods of time have molecular weights as high as 40,000 to 50,000. We have carried out the thermal decomposition both in the presence and absence of oxygen, for example in nitrogen, and have found that there is no difference in the type of polymer, although the presence of oxygen does seem to favor the obtaining of the higher molecular weight product in the same time of heating.

As pointed out above, if it is desired to produce polymers directly from the halophenols, a solvent can be used in which the complex is soluble and the complex thermally decomposed to the polymer without isolating the complex. The polymers so obtained have the same molecular weight and properties as those obtained by first isolating the complex followed by thermal decomposition. The following examples illustrate this feature of our invention.

Example 8

A solution of 9.75 grams cupric hydroxide, 39.5 grams of 2,4,6-trichlorophenol, 16 ml. of pyridine and 150 ml. of toluene were heated at reflux for 3 hours in a flask equipped with a condenser and a trap for separating the water. At the end of this time, a precipitate had formed weighing 19 grams, which was identified as the pyridine complex of cupric chloride having 2 moles of pyridine associated with 1 mole of cupric chloride. The filtrate was poured into 750 ml. of methanol containing 10 ml. of concentrated hydrochloric acid to precipitate the polymer. After filtering off the polymer, it was washed with methanol, redissolved in benzene, and reprecipitated again in methanol containing hydrochloric acid, to obtain 25 grams of white polymer as a fine powder having an intrinsic viscosity of 0.048.

When this example was repeated using three times the quantity of reagents and continuing the heating period for about 18 hours, a polymer having an intrinsic viscosity of 0.05 corresponding to a molecular weight of about 10,000 was obtained. The polymer had a chlorine analysis of 43.9 versus the theoretical of 44%. This polymer had repeating units, represented by the formulae

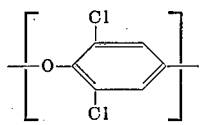

and

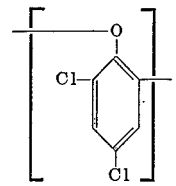

When 20 grams of the above polymer was dissolved in 150 ml. of toluene containing 0.5 ml. of pyridine and 2.5 grams of cupric hydroxide and again refluxed for about 18 hours, the polymer was increased in molecular weight and had an intrinsic viscosity of 0.082, corresponding to a molecular weight of about 45,000.

Example 9

When Example 8 was repeated using 145 parts of 2,6-dichloro-4-bromophenol in place of the 119 parts of 2,4,6-trichlorophenol, the reaction became extremely vigorous as soon as the solution started to reflux, showing that the bromine in the para position was more rapidly removed in the decomposition reaction than the chlorine in Example 8. After precipitating the polymer from the solution, there was obtained 94 parts of very white polymer having an intrinsic viscosity of 0.048, corresponding to a molecular weight of 12,500. When 8 grams of this polymer were thoroughly heated in solution as described in Example 8, the molecular weight was increased, as shown by the polymer having an intrinsic viscosity of 0.08, corresponding to a molecular weight of about 40,000. This polymer has the same repeating units as the polymer of Example 8, except in this case essentially all of the polymer units are joined to the para position because of the greater reactivity of the bromo substituent in the para position.

Example 10

This example illustrates the higher thermal stability of the cupric complex from a pentahalophenol. A solution of 9.75 grams of cupric hydroxide, 53.3 grams of pentachlorophenol, 16 ml. of pyridine and 150 ml. of toluene were reacted as described in Example 8. At the end of the reaction time, the green solid which had precipitated from the solution was filtered off and identified as the copper pyridine complex of pentachlorophenol represented by the formula

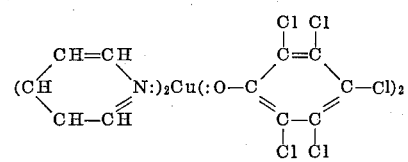

When this example was repeated using diphenyl ether in place of toluene as the solvent, and the solution refluxed for a period of 2 hours, there was obtained 26 grams of an almost white polymer of poly(tetrachlorophenylene ether) having an intrinsic viscosity of 0.02 and a chlorine content of 58.9% compared to a theoretical 61.7%.

Example 11

This example illustrates the use of our halogenated polymer as a flame-proofing material. A composition is made containing 6 parts of the polymer obtained in Example 10, 10 parts of polyethylene, 2 parts of antimony trioxide, and 0.2 part of bis(α,α-dimethylbenzyl)peroxide. After thorough mixing of these materials on a hot differential roll, the mixture was press-cured at 170° C. for 20 minutes to obtain a flexible panel of cross-linked polyethylene which was found to be self-extinguishing when ignited.

In addition to their use for making flame-proof compositions with other polymers, our polymers may be used alone if desired. Because of their excellent mechanical, chemical, electrical and thermal properties, the polymers obtained by use of our novel complexes have many and varied uses. For example, they can be used in molding powder formulations, either alone or mixed with various fillers, such as wood flour, diatomaceous earth, carbon black, silica, etc., to make molded parts, such as spur, helical, worm or bevel gears, ratchets, bearings, cams, impact parts, gaskets, valve seats for high pressure oil and gas systems or other chemical fluids requiring resistance to chemicals, etc. They may be mixed with abrasives, such as garnet, silicon carbide, diamond bort, etc., to make abrasive discs, papers, etc. They can be used to prepare molded, calendered or extruded articles, films, coatings, threads, filaments, tapes and the like. They can be applied to a broad spectrum of uses in the form of sheets, rods, tapes, etc., and are useful in electrical applications, such as in cable terminals, terminal blocks, backing for electrical circuits, as components of dynamoelectric machines that operate at high temperatures, etc. Films of these materials can be prepared by suitable means, such as by dissolving or suspending them in a suitable solvent, followed by spreading on a surface from which the polymer is removed after evaporation of the solvent, by calendering or extrusion, etc. These films (either oriented or not) are useful as metal or fiber liners, containers, covers, closures, electrical insulating tapes, as sound recording tapes, pipe and wire tapes, etc. As a coating material they can be applied as a solution or suspension to any convenient foundation where a surface possessing their excellent properties is desired. They can be used as an encapsulation material, for electrical insulation, for example, as a wire enamel, potting compound, etc. They can be extruded from melt, solution or suspension into a precipitating solvent or evaporating medium, etc. The fibers so produced (oriented or not) can be woven into fabrics useful in many applications, for example, as filter cloths where high chemical and heat resistance is desired. Their excellent electrical properties make laminates of this material useful for electrical equipment, such as slot wedges in the armature of an electric motor, panel boards or printed circuits, electrical appliance panels, radio and television panels, small punched electrical pieces, transformer terminal boards, transformer coil spacers, etc. The polymers may also be mixed with various fillers, modifying agents, etc., such as dyes, pigments, stabilizers, plasticizers, etc.

Obviously, other modifications and variations of the present invention are possible in the light of the above teachings. It is, therefore, to be understood that changes may be made in the particular embodiments of the invention described which are within the full intended scope of the invention as defined by the appended claims.

What we claim as new and desire to secure by Letters Patent of the United States is:

1. The process of preparing poly(halophenylene ethers) which comprises heating a solution of the cupric complex having the empirical formula

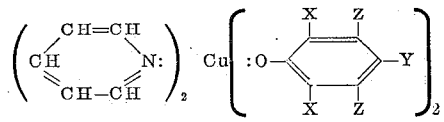

where X is a halogen selected from the group consisting of fluorine and chlorine and, in addition, bromine when Y and each Z are bromine, Y is a halogen selected from the group consisting of chlorine, bromine and iodine, and Z is a monovalent substituent selected from the group consisting of hydrogen, fluorine and chlorine and, in addition, bromine when Y and each Z are bromine, to a temperature in the range of from 80° up to the reflux temperature of the solution.

2. The process of claim 1 wherein each X, Y and Z is chlorine.

3. The process of claim 1 wherein each X and Y is chlorine and Z is hydrogen.

4. The process of claim 1 wherein each X is chlorine, Y is bromine, and Z is hydrogen.

References Cited by the Examiner

UNITED STATES PATENTS

| | | | |
|---|---|---|---|
| 2,756,233 | 7/1956 | Elliot | 260—270 |
| 2,827,463 | 3/1958 | Shaeffer | 260—270 |
| 3,133,899 | 5/1964 | Kwiatek | 260—47 |
| 3,134,753 | 5/1964 | Kwiatek | 260—47 |

WILLIAM H. SHORT, *Primary Examiner.*

J. C. MARTIN, *Assistant Examiner.*